United States Patent [19]

Green et al.

[11] Patent Number: 4,738,421

[45] Date of Patent: Apr. 19, 1988

[54] SELF-ORIENTING DEVICE

[75] Inventors: Richard F. Green; LeRoy L. Manor, both of Jackson, all of Mich.

[73] Assignee: Sparton Corporation, Jackson, Mich.

[21] Appl. No.: 929,718

[22] Filed: Nov. 12, 1986

[51] Int. Cl.[4] .............................................. H04B 1/34

[52] U.S. Cl. .................................... 248/168; 343/705; 343/720

[58] Field of Search ............ 248/550, 150, 370, 163.1, 248/166, 434, 435, 168, 169, 170, 171, 436, 439, 188.7, ; 102/394, 404, 401, 342, 351, 357, 387; 244/138 R; 441/32-33; 343/705, 720

[56] References Cited

U.S. PATENT DOCUMENTS

| | | | |
|---|---|---|---|
| 1,859,289 | 5/1932 | Dalton | 248/171 |
| 2,398,794 | 4/1946 | Maltby . | |
| 3,465,251 | 9/1969 | Meek | 244/138 R |
| 3,870,263 | 3/1975 | Hardiman . | |
| 4,022,414 | 5/1977 | Egger | 248/150 |
| 4,640,482 | 2/1987 | Rogers | 248/168 |

FOREIGN PATENT DOCUMENTS

| | | | |
|---|---|---|---|
| 585333 | 11/1958 | Italy | 102/394 |
| 763924 | 12/1956 | United Kingdom | 248/150 |
| 1533111 | 11/1978 | United Kingdom | 441/33 |

*Primary Examiner*—J. Franklin Foss
*Assistant Examiner*—Robert A. Olson
*Attorney, Agent, or Firm*—Reising, Ethington, Barnard, Perry & Milton

[57] ABSTRACT

A self-orienting device is disclosed for a transducer adapted to be dropped from an aircraft or other vehicle. An elongated body is provided with first, second and third arms each of which is pivotally connected with the body for pivotal motion between a stowed position parallel to the body and an erect position perpendicular to the body. The first and second arms are disposed on opposite sides of the body and the third arm is disposed therebetween. An actuator spring is provided on each arm urging it from the stowed position to the erect position and a tubular housing over the arms and body retains the arms in the stowed position. The third arm is also retained in the stowed position by a separate releasable retainer. After the transducer comes to rest on the ground, an ejector spring is released to separate the housing from the arms and the body whereby the first and second arms move to the erect position. After a predetermined time delay, the retainer on the third arm is released; if the body is lying right-side-up, i.e. with the third arm on the upper side of the body, the third arm will move to its erect position so that it is oriented perpendicular to the ground. If the body is in the wrong-side-up position before release of the third arm, the pivotal motion of the third arm will flip the body over to the right-side-up position and the third arm will be perpendicular to the ground.

10 Claims, 3 Drawing Sheets

SELF-ORIENTING DEVICE

FIELD OF THE INVENTION

This invention relates to self-orienting devices; more particularly, it relates to orienting devices for transducers which are dropped from an aircraft or other vehicle.

BACKGROUND OF THE INVENTION

In geophysical exploration, military operations and other activities, it is desired to place a device, for example a transducer, at a remote location by dropping it from an aircraft, a boat or land vehicle. For certain applications, the device must be oriented with respect to the ground or other supporting surface without the help of manual manipulation after it is dropped. While certain forms of self-orienting devices are known in the prior art, they are not satisfactory in respect to performance and simplicity and economy of manufacture for some applications.

The Hardiman et al U.S. Pat. No. 3,870,263 granted Mar. 11, 1975 discloses a self-erecting pod especially adapted for orientation of a vehicle-dropped radio transmitter. In this device, the pod is provided with at least three spring loaded arms which are equally spaced and pivoted to the body of the pod adjacent one end. The arms are stowed with the free ends extending toward the other end of the pod. After the pod is dropped, the arms are released and are pivoted by spring force to raise the pod from the ground to an erect position on the plurality of arms. The pod carries a radio transmitter and an antenna which is more or less perpendicular to the ground.

The Maltby U.S. Pat. No. 2,398,794 granted Apr. 23, 1946, discloses a submarine mine adapted to be dropped from an aircraft. It comprises a body with a set of spring actuated fins which are pivotally mounted but normally restrained against movement until released by a water pressure responsive device. When the mine reaches the bottom, the fins are released and are pivoted by spring actuators to hold the body of the mine in an upright position. A set of four equally spaced fins are employed.

A general object of this invention is to provide a self-orienting device which overcomes certain disadvantages of the prior art.

SUMMARY OF THE INVENTION

In accordance with this invention, a self-orienting device is provided which will come to rest with its body lying on the ground and one arm in an upright position substantially perpendicular to the ground. Further, the body will be properly oriented for ejecting a ground spike into the ground. The body is held in position by a pair of stabilizing arms extending laterally and engaging the ground.

Further, in accordance with the invention, a body is provided with two stabilizing arms and a third arm, each pivotally connected with the body adjacent one end for pivotal motion between a stowed position parallel to the body and an erect position perpendicular to the body. The two stabilizing arms are disposed on opposite sides of the body and the third arm is disposed therebetween. First means are provided for pivoting the two stabilizing arms from the stowed position to the erect position and second means are provided for pivoting the third arm from the stowed position to the erect position after the stabilizing arms have reached the erect position. The pivoting of the third arm when the body is resting on the ground causes the body to be oriented with the two stabilizing arms on the ground and the third arm pointing up.

Further, in accordance with the invention, the third arm constitutes an antenna. The body may be provided with a ground spike with an exit port opposite the third arm with means for ejecting the ground spike into the ground. The ejection means comprises an explosive cartridge with time delay means for firing the cartridge.

A more complete understanding of this invention will be obtained from the description that follows taken with the accompanying drawings.

BEST MODE FOR CARRYING OUT THE INVENTION

Figure 1:
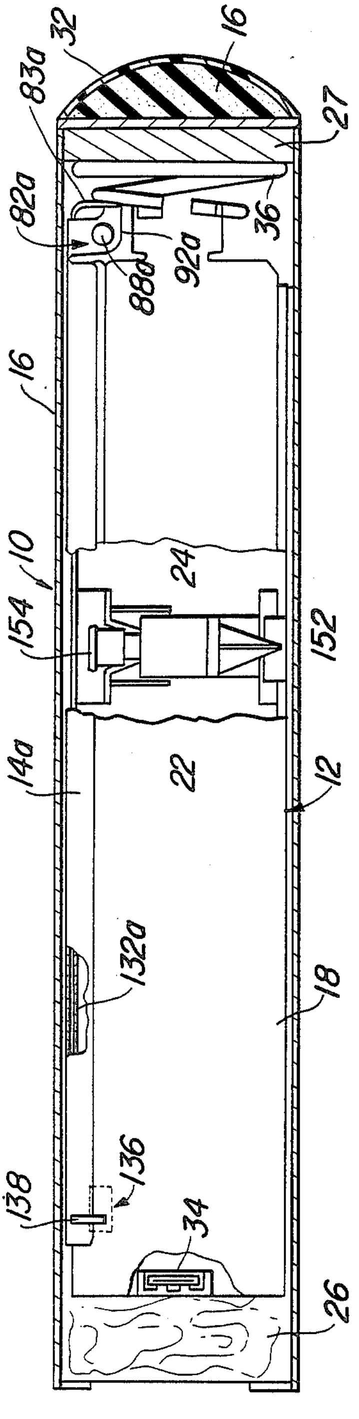
FIG. 1 shows a longitudinal view of the transducer in cross section.

Referring now to the drawings, there is shown an illustrative embodiment of the invention in a transducer especially adapted for parachute drop from an airplane. The transducer comprises a geophone ground spike to be ejected into the ground and an antenna to be oriented perpendicular to the ground. It will be appreciated as the description proceeds that the invention is useful in other applications and may be realized in many different embodiments.

Figure 2:
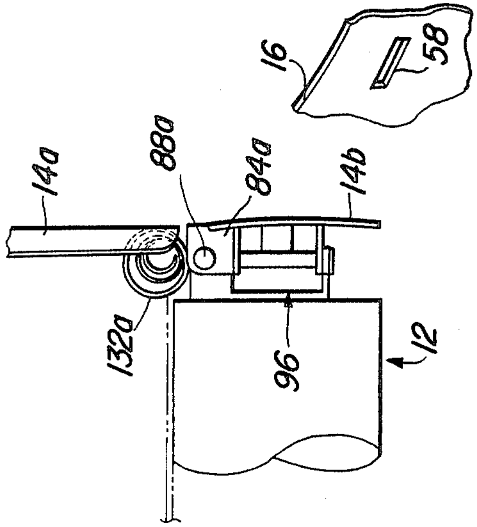
FIG. 2 shows a detail of construction of the arms.

As shown in FIGS. 1 and 2, the transducer 10 comprises, in general, a cylindrical casing or body 12 which carries a set of three pivotable arms **14*a*, 14*b*, and 14*c*. Arm 14*a* is an operational element, namely a transmitting antenna, and arms 14*b* and 14*c* are support arms for stabilizing the position of the body when it lies on the ground. The cylindrical body 12 and the arms folded thereagainst in a retracted or stowed position parallel to the body are contained within a cylindrical tubular transducer housing 16. The cylindrical body 12 contains an electronic module 18 and a ground spike 22. The ground spike 22 contains a geophone 24 which is adapted to be implanted into the ground. Signals generated by the geophone 24 are coupled through electrical wiring to the electronic module 18 and are processed thereby for transmission to a remote station. For this purpose, the electronic module 18 has an output terminal (not shown) which is coupled with the arm 14***a* which serves as a transmitting antenna. The housing 16 also contains a parachute 26 which is utilized to slow the descent of the transducer 10 from the aircraft to the ground. The parachute 26 is attached to a release plate 34 which is latched to the housing 16. The transducer 10 will be described in greater detail subsequently.

Figure 11:
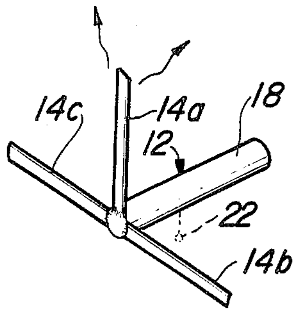
FIG. 11 shows the body of the transducer in operational position.

Before considering the details of construction, it will be helpful to refer to FIG. 11 which shows the transducer in its operative position on the ground. As shown in FIG. 11, the cylindrical body 12 lies upon the ground with the stabilizing arms 14*b* and 14*c* in the erect or extended position in contact with the ground. The arm 14*a* which serves as a transmitting antenna is in an erect or upstanding position perpendicular to the ground. The geophone in the ground spike 22 is implanted in the ground and is electrically connected with the electronic module 18 in the body 12. This orientation allows the body 12 to lie against the ground in good contact therewith and the arm 14*a* is perpendicular to the ground which is the optimum position for a ground plane antenna. It is noted with reference to FIG. 11 that the arms 14*b* and 14*c* are mounted on opposite sides of the body 12, i.e. they are diametrically opposite each other. The arm 14*a* is mounted on the body 12 at a location between arms 14*b* and 14*c* preferably so that it extends perpendicular to arms 14*b* and 14*c*.

Referring now to FIGS. 1 through 7 and FIGS. 14 and 15, the transducer 10 will be described in greater detail. The housing 16 is a cylindrical tube which is closed at its front end by a wall 28. The housing is provided with a blunt, padded nose 32 which tends to prevent it from sticking in the ground and which serves to cushion the shock upon impact of the transducer with the ground. The body 12 is also of cylindrical shape and is retained in the housing 16 between the front wall 28 and a release plate 34 which extends transversely of the housing 16 at the rear end thereof. An ejector spring 36 is seated against a reinforcing plate 27 which bears against the front wall 28 of the housing. The rear end of the spring 36 bears against a seating surface on a latch plate 116 (see FIG. 15) at the forward end of the body 12. The release plate 34 is located so as to hold the ejector spring 36 in a state of compression between the seating surface on latch plate 116 and the front wall 28. The ejector spring 36 is capable of exerting sufficient force between the housing 16 and the body 12 so as to completely separate them from each other when the release plate 34 is released.

Figure 5:
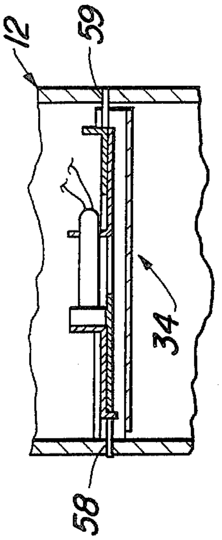
FIG. 5 is a view taken on lines 5—5 of FIG. 4.
Figure 3:
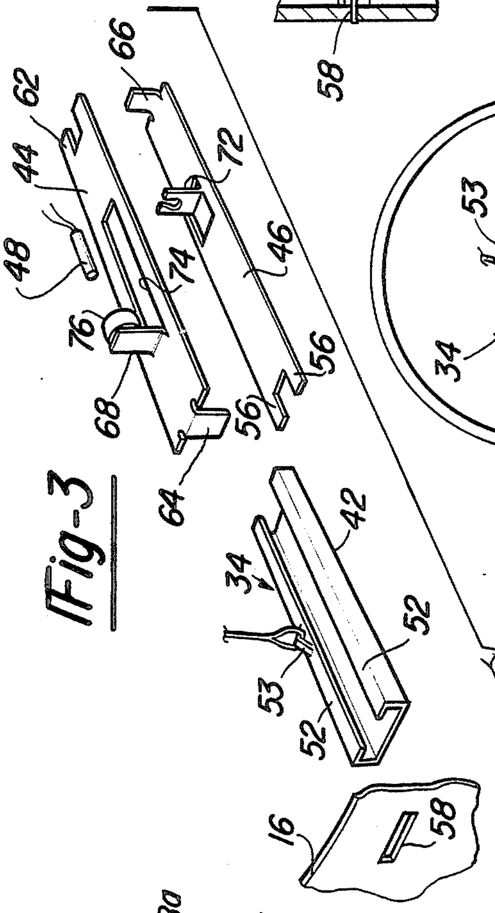
FIG. 3 is an exploded view of a release plate for the transducer body.
Figure 4:
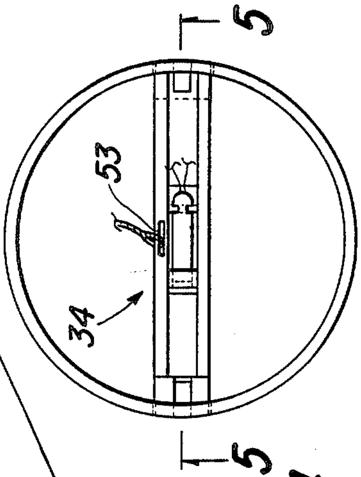
FIG. 4 shows the release plate in the housing of the transducer.

The release plate 34 is shown in detail in FIGS. 3, 4 and 5. It comprises, in general, a guide member 42 which carries a rear slide plate 44 and a front slide plate 46 which are actuated by an explosive cartridge or squib 48. The guide member 42 is channel shaped with oppositely disposed retaining flanges 52 at the open side of the channel shaped member. One of the flanges 52 is provided with an eyelet 53 for attachment of the cord of the parachute 26. The slide plates 44 and 46 are disposed face to face within the channel of the guide member 42 and are adapted for reciprocal motion therein. The front slide plate 46 is bifurcated at one end to provide spaced latch fingers 56 which are adapted to extend into a keeper slot 58 in the wall of the housing 16. The opposite end of the rear slide plate 44 is bifurcated to form a pair latch fingers 62 which are adapted to extend into a keeper slot 59 disposed diametrically opposite the slot 58 in the wall of the housing 16. The slide plate 44 is provided with a stop flange 64 at its opposite end. The stop flange 64 is straddled by the latch fingers 56 and limits the sliding motion of the slide plate 44 relative to slide plate 46. Similarly, the slide plate 46 is provide with a stop flange 66 which extends between the latch fingers 62 on the plate 44 and limits the relative sliding motion. For the purpose of holding the explosive squib 48, the rear slide plate 44 is provided with a bracket 68 and the front slide plate 46 is provided with a bracket 72 which extends through a slot 74 in the slide plate 44. The squib 48 is supported at its rear end by the bracket 72 and the discharge end of the squib is received in a drive cup 76 mounted on bracket 68. When the release plate 34 is in its latched position, the slide plates 44 and 46 are extended relative to each other so that the latch fingers 56 extend into the keeper slot 58 and the latch fingers 62 extend into the diametrically opposite keeper slot 59. When the squib 48 is fired by an electrical signal from the electronic module 18 the explosive force pushes the brackets 68 and 72 apart and retracts the latch finger 56 and latch finger 62 from the respective keeper slots. When the release plate 34 is actuated, the body 12 and the release plate 34 and the attached parachute 26 are free to move relative to the housing 16 under the influence of the ejector spring 36 and are completely separated thereby from the housing.

The arms 14*a*, 14*b*, and 14*c* will be described in greater detail with reference to FIGS. 1, 2, 14, 15 and 16. The three arms are of identical construction except for a detail of arm 14*a* as described below, and corresponding parts are referred to by the same reference numeral followed by the letter a, b or c corresponding respectively with arms 14*a*, 14*b*, and 14*c*. As shown in FIGS. 1 and 2, arm 14*a* is arcuate in cross section such that it conforms to the cylindrical body 12 in the retracted or stowed position. The arm 14*a* terminates at its forward end in a hinge bracket 82*a* which is formed as a unitary part of the arm. The hinge bracket 82*a* comprises a pair of spaced flanges 84*a* each of which is provided with a circular hole which accepts a hinge pin 88*a*. The hinge bracket 82*a* has a unitary stop finger 83*a* which extends perpendicular to the arm 14*a* for stopping the pivotal motion of the arm at the erect position. For this purpose the finger 83*a* is adapted to engage hinge plate 96, to be described presently, as a reaction member. Each of the hinge flanges 84*a* is provided with a latch keeper or notch 92*a* for the purpose of latching the arm in its erect position, as will be described subsequently. The arms 14*a*, 14*b*, and 14*c* are supported on the hinge plate 96 shown in FIGS. 14 and 15. The hinge plate 96 comprises a flat base 98 and three pairs of hinge brackets, namely brackets 102*b*, brackets 102*c* and brackets 102*a* which correspond with arms 14*b*, 14*c*, and 14*a*, respectively. The base 98 of the hinge plate 96 is fixedly mounted on the forward end of the body 12. The hinge flanges 84*a* are mated with the pair of hinge brackets 102*a* and secured thereto with the hinge pin 88*a*. Similarly, the arms 14*b* and 14*c* are secured for pivotal motion with the pair of hinge brackets 102*b* and the pair of hinge brackets 102*c* by the respective hinge pins 88*b* and 88*c*. A latch plate 116 of spring metal is mounted on the base 98 of the hinge plate 96 through the intermediary of a support block 118. The latch plate 116 is provided with three pairs of spring latch fingers 122*a*, 122*b*, and 122*c* which are unitary with the plate.

The end of the latch finger 122a engages the arcuate surface of the hinge flanges 84a and is adapted to deflect into keeper notches 92a therein when the arm 14a is in its erect position. Similarly, the pair of latch fingers 122b and the pair of latch fingers 122c coact with the hinge flanges of the respective arms 14b and 14c to latch them in the erect position.

As described above, arm 14a is operational as a radio antenna. For this purpose, it is constructed of metal and is electrically insulated from the body 12 when in the erect position. The insulation may be provided in any suitable form. Alternatively, the arm 14a may be constructed of an insulating material, such as plastic, and the antenna may be provided as a conductive wire on the arm.

Figure 15:
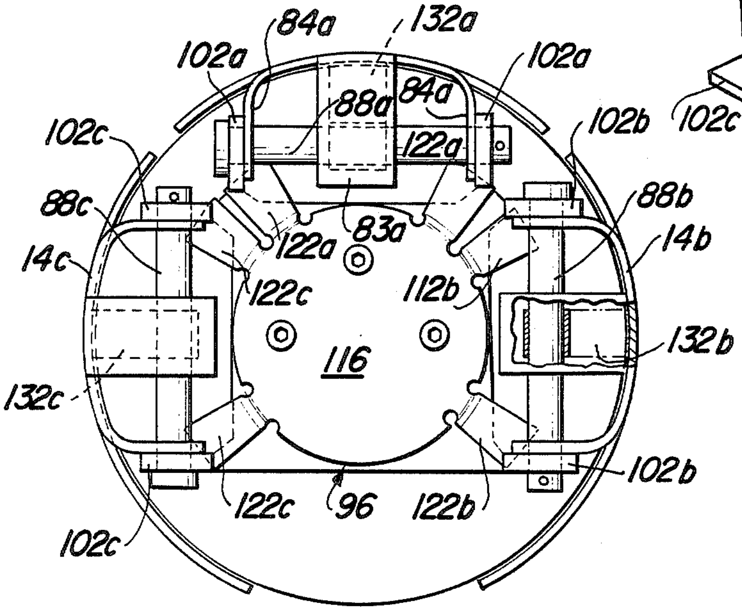
FIG. 15 is a view taken on lines 15—15 of FIG. 14.

An actuator spring 132a is provided for moving the arm 14a from the stowed position to the erect position. As shown in FIGS. 1, 2, 14 and 15 the actuator spring 132a coacts between the body 12 and the arm 14a. The forward end of the spring 132a is secured to hinge pin 88a by encircling the pin, as shown in FIG. 15, and the rear end of the spring 132a is free. The spring is made of ribbon-like spring material which is tightly coiled in its unstressed condition and may be held flat or uncoiled in a stressed or energy storage condition. As shown in FIG. 1, with the arm 14a in its stowed position the spring 132a is held flat under the arm. When the arm 14a is released, the spring 132a winds itself into the coiled position forcing the arm 14a to pivot about its hinge pin 88a to the erect position. Arms 14b and 14c are provided with respective actuator springs 132b and 132c in the same manner as described for arm 14a.

Figure 6:
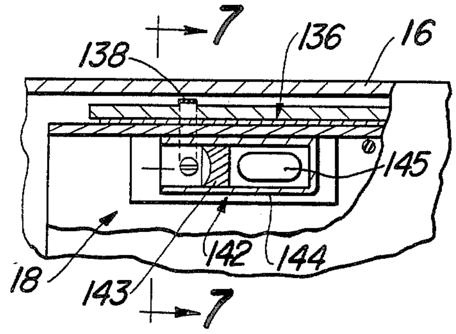
FIG. 6 shows a releasable clamp for an arm.
Figure 7:
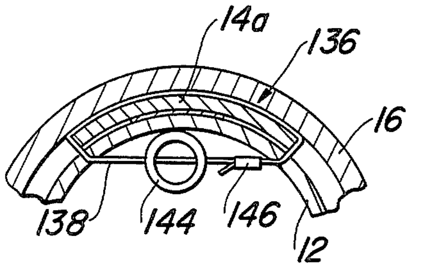
FIG. 7 is a view taken on lines 7—7 of FIG. 6.

The arms 14a, 14b, and 14c are retained in the stowed position by the tubular housing 16 which encases the body 12 and the arms. Further, however, the arm 14a is also retained in the stowed position by a releasable clamp 136, as shown in FIGS. 6 and 7. The releasable clamp comprises a tie strap 138 and a clamp release device 142. The strap 138 extends over the arm 14a near the free end thereof and passes through openings in the body 12 and through an opening in the wall of cylinder 144 of the release device 142 with the free ends being joined by a coupling 146. The clamp release device 142 comprises a piston 143 with a sharp peripheral edge and movable in the cylinder 144 for cutting the strap 138. An actuator in the form of an explosive cartridge or squib 145 is provided for actuating the piston. The squib is fired by an electrical signal from the electronic module 18 to cut the strap 138 and release the arm 14a.

As discussed above, the ground spike 22 which contains the geophone 24 is adapted to be implanted into the ground. For this purpose, the body 12 is provided with a laterally extending chamber 152 which receives the ground spike 22. The chamber 152 contains an explosive cartridge or squib 154 at the closed end of the chamber. The squib 154 is fired by an electrical signal from the electronic module 18. When the squib is fired, the ground spike 22 is ejected from the chamber 152 and is adapted to penetrate the ground.

The electronic module 18 is adapted to receive signals from the geophone 24 and includes a signal processor and radio transmitter which is coupled with the arm 14a which serves as the transmitting antenna. The electronic module also generates electrical signals for firing the squibs 48, 145 and 154. The squib 48 is fired after the transducer 10 has landed on the ground in order to separate the body 12 from the housing 16. For this purpose, the electronic module 18 generates a first electrical signal for firing squib 48 a predetermined time after the transducer is launched from the aircraft, the time delay being set in accordance with the height of drop and other factors. The electronic module develops the second electrical signal for firing the squib 145 to release the arm 14a at a predetermined time after the first electrical signal. A third electrical signal for firing the squib 154 is developed by the electronic module a predetermined time after the second electrical signal to eject the ground spike 22 and implant it in the ground.

Figure 8:
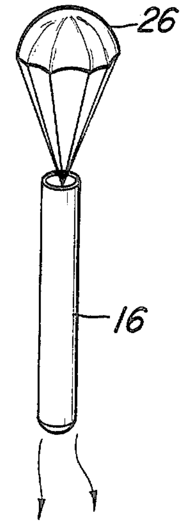
FIG. 8 shows the transducer of this invention in a parachute drop.
Figure 12:
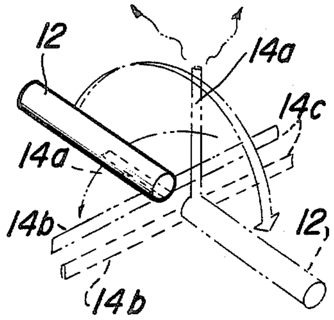
FIG. 12 illustrates movements of the body from a wrong-side-up position on the ground to an erect or operational position.
Figure 13:
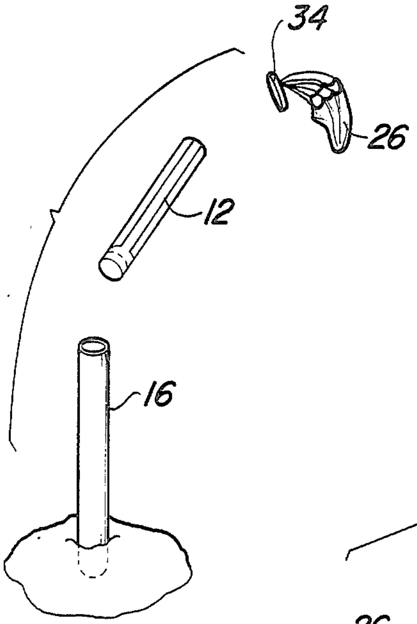
FIG. 13 shows separation of parts of the transducer with the housing stuck in the ground.
Figure 9:
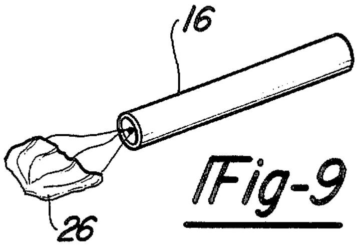
FIG. 9 shows the transducer resting on the ground.
Figure 10:
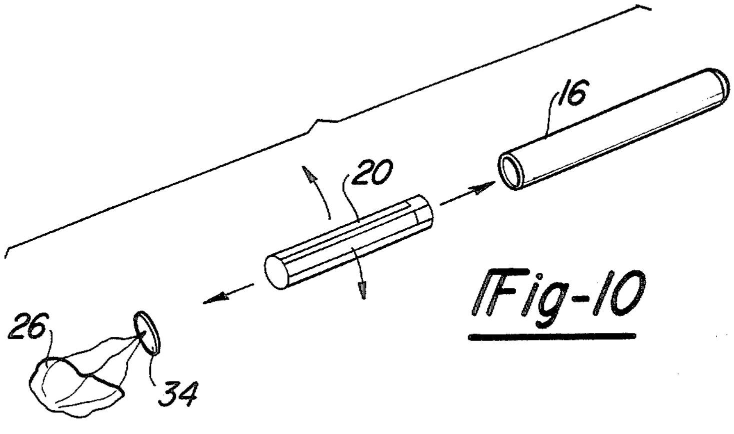
FIG. 10 shows the separation of parts of the transducer lying on the ground.
Figure 14:
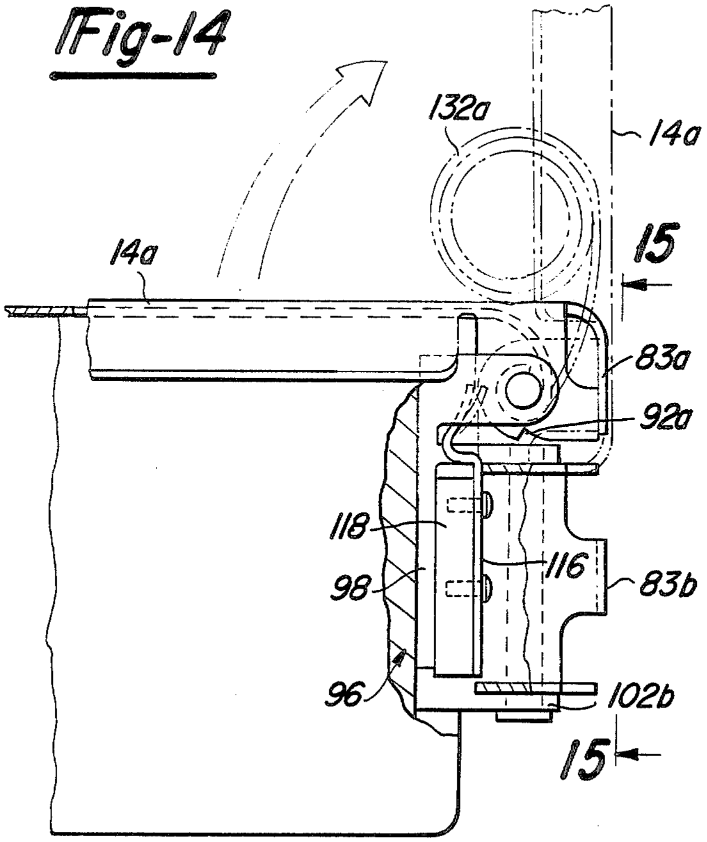
FIG. 14 shows a portion of the body with an arm in alternate positions.
Figure 16:
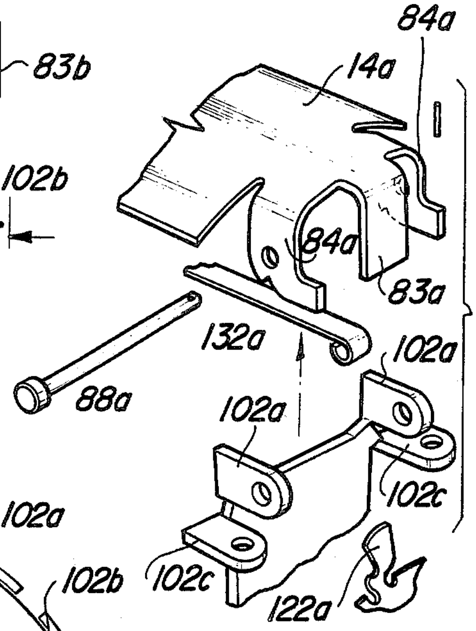
FIG. 16 is an exploded view showing details of an arm.

The operation of the transducer 10 will now be described with reference primarily to FIGS. 8 through 13. The transducer 10 is launched or dropped from an aircraft in the condition as illustrated in FIG. 8. The parachute 26 is provided with a drag blade (not shown) which deploys the parachute immediately upon launch of the transducer. The parachute carries a lanyard (not shown) which actuates a switch on the electronic module 18 to turn it on. This starts the timer for measuring the time delays for generating the electrical signals for firing the squibs 48, 145, and 154. When the transducer impacts the ground, it will either fall over on its side as shown in FIG. 9 or possibly stick in the ground in an upright position as shown in FIG. 13. In either case, after the first time delay, the first electrical signal fires the squib 48 and actuates the release plate 34 to the released position. This permits the ejector spring 36 to separate the housing 16 from the body 12 and from the release plate 34 and the attached parachute 26, as shown in FIG. 10. When the housing 16 is separated from the body 12, the arms 14b and 14c are released thereby and they are moved by the respective actuator springs to the erect position as shown in FIG. 11. The arms 14b and 14c are latched in the erect position by the respective latch fingers 122b and 122c. With the arms 14b and 14c in the erect position, the transducer 10 is oriented on the ground with the body 12 and the two stabilizing arms 14b and 14c lying on the ground. This orientation is shown in FIG. 12, with the arm 14a in the wrong-side-up position, i.e. underneath the body 12. (The only alternate orientation would be the same except that the arm 14a would be on the upper side of the body 12.) After the second predetermined time delay, the squib 145 is fired and the band 138 is cut to release the arm 14a. The spring 132a moves the arm 14a to the erect position; this movement of the arm 14a is effective to flip the body 12 over to its right-side-up position as shown in dashed lines on FIG. 12 and also as shown in FIG. 11. Thus, the arm 14a which constitutes the transmitting antenna is oriented perpendicular to the ground. After the third time delay, the squib 154 is fired. This ejects the ground spike 22 from the body 12 and it is implanted in the ground as shown in FIG. 11. In this condition, the geophone 24 is adapted to sense vibrations or shock waves in the ground and the signals are applied to the electronic module 18 which transmits the signals by radio to a base station using the arm 14a as the transmitting antenna.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A self-orienting device comprising:

an elongated body, first, second and third arms each pivotally connected with said body adjacent one end thereof for pivotal motion between a stowed position parallel to said body and an erect position perpendicular to said body, said first and second arms being disposed on opposite sides of said body and said third arm being disposed between said first and second arms, first means for pivoting said first and second arms from said stowed position to said erect position, and second means for pivoting said third arm from said stowed position to said erect position after said first and second arms have reached said erect position, whereby said pivoting of said third arm when said body is resting on the ground causes said body to be oriented with said first and second arms on the ground and with said third arm pointing up.

2. The invention as defined in claim 1 wherein:

said first means comprises spring means for urging said first and second arms from said stowed position to said erect position, first releasable retaining means for holding said first and second arms in said stowed position, and first release means for releasing said retaining means.

3. The invention as defined in claim 2 wherein said second means comprises:

spring means for urging said third arm from said stowed position to said erect position, second releasable retaining means for holding said third arm in said stowed position, and second release means for releasing said second retaining means.

4. The invention as defined in claim 2 wherein:

said first retaining means comprises a tubular housing containing said body and said arms, and said first release means is a first actuating means for separating said tubular housing from said arms and said body.

5. The invention as defined in claim 3 wherein:

said second releasable retaining means comprises a clamp for holding said third arm in said stowed position.

6. The invention as defined in claim 4 wherein said first actuating means comprises:

a compressed spring acting between said body and said housing, latch means acting between said body and said housing, a first explosive cartridge for releasing said latch means, and time delay means for firing said first explosive cartridge.

7. The invention as defined in claim 3 wherein said second releasable retaining means is a clamp and said second release means comprises:

a second explosive cartridge for releasing said clamp, and time delay means for firing said second explosive cartridge.

8. The invention as defined in claim 1 including:

a ground spike disposed in said body with an exit port opposite said third arm, and ejection means for ejecting said ground spike from said body into the ground.

9. The invention as defined in claim 8 wherein said ejection means comprises:

an explosive cartridge disposed in said body, and time delay means for firing said explosive cartridge.

10. The invention as defined in claim 1 wherein said third arm is an antenna.

* * * * *